Patented May 3, 1932

1,856,862

UNITED STATES PATENT OFFICE

FRED BRYNER, OF MIDLAND, MICHIGAN, ASSIGNOR TO THE DOW CHEMICAL COMPANY, OF MIDLAND, MICHIGAN, A CORPORATION OF MICHIGAN

PREPARATION OF ARYL PHOSPHATES

No Drawing. Application filed September 28, 1929. Serial No. 396,015.

The present invention relates to the preparation of aryl phosphates, particularly triphenyl phosphate, and especially to a method involving the purification thereof.

Triaryl phosphates are usually made by reacting between a phenolic compound and a phosphorus oxyhalide in the presence of a catalyst, heating the reaction mixture, first sufficiently to react all of the oxyhalide and a portion of the phenolic compound whereby at least a mono-aryl phosphate derivative is formed, and then at a higher temperature sufficiently to complete the reaction with the formation of a triaryl phosphate. The hot reaction product while still liquid is washed to remove halogen acid and unreacted phenolic compound, and then cooled to solidify the product which is separated from the wash liquors. The product is then subjected to a further purification, if desired, such as recrystallization from a suitable solvent with or without a decoloration treatment, i. e. treatment with a charcoal.

In making triaryl phosphates by the aforesaid method, it is difficult to prepare a pure product which is free from halogen and which is and will remain white, due to the difficulty of removing the halogen-containing impurities from the reaction product. I have now found that when volatile halogen compounds resulting from the reaction are removed from the reaction product previous to washing thereof, the crude reaction product is more susceptible to purification, and a final product of the highest purity is obtained.

To the accomplishment of the foregoing and related ends, the invention, then, consists of the method hereinafter fully described and particularly pointed out in the claims, the following description setting forth various ways in which the principle of the invention may be used.

For the purpose of illustration, my present invention will be described as applied to the preparation of triphenyl phosphate. For instance, phenol is reacted with a phosphorus oxyhalide in any preferred manner. After the reaction is completed and preferably before the reaction mixture has cooled appreciably, volatile halogen compounds, e. g. hydrogen halide and unreacted phosphorus oxyhalide, are substantially completely removed by blowing or otherwise contacting the liquid reaction mixture with air or other gas inert to the major reaction components. After such treatment, the reaction mixture may be worked up in any of the usual ways, such as by washing with aqueous alkali to remove phenol, and followed by recrystallization from a solvent or other treatment such as decolorization with a charcoal, or by distillation, if so desired.

The following example serves to illustrate one preferred manner of operation, but it is to be understood that such example does not limit my invention:

Example 1

3 moles of phenol was reacted with one mole of phosphorus oxychloride in the presence of one-half percent of substantially anhydrous magnesium chloride, the temperature being maintained at 95–105° C. until all of the phosphorus oxychloride was added, and then raised to approximately 150° C., at which temperature the reaction was finished. Volatile chloro compounds were then blown out from the liquid reaction product by means of air, and the product washed first with water and then with dilute caustic soda solution at a temperature sufficiently high to keep the reaction product in the liquid form. After cooling, the solidified granular product was separated from the liquor by centrifuging, and then further purified by charcoal treatment and recrystallization from alcohol.

I do not limit my invention to the specifically above mentioned components. Other aryl phosphates, e. g. tricresyl phosphate and trinaphthyl phosphate, may be prepared similarly by my improved procedure.

Other gases, such as nitrogen or carbon dioxide, may be employed to blow out volatile halo-compounds. The gas utilized may be passed, for example, through the reaction mixture during the entire course of the reaction, or only after the phosphorus oxyhalide has been reacted completely. The latter procedure is preferable, in order to prevent loss by such gas carrying the oxyhalide from the reaction mixture.

A further advantage of my improved method of procedure is that the air current, besides removing volatile halogen compounds, oxidizes organic impurities and others, such as iron compounds, if present, and substantially prevents the presence of the latter in the finished product since ferric hydroxide for example is more easily coagulated and removed in the caustic washing step than the corresponding ferrous compound. Such oxidation may, if desired, be performed by means of an oxidizing agent in the wash liquors.

In brief, my invention concerns an improved method for the preparation of aryl phosphates whereby a pure product is obtained, and one which retains its color on standing, such improvement involving contacting the reaction mixture with a current of gas, preferably air, to remove volatile compounds such as a gaseous hydrohalide and phosphorus oxyhalide, and to oxidize impurities, such as iron compounds, if the latter be present.

The products obtainable by my improved procedure, i. e. triaryl phosphates, are known and used in the lacquer, cellulose and other industries.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method of making an aryl phosphate, which comprises reacting a phenolic compound with a phosphorus oxyhalide and blowing through the reaction mixture a gas substantially inert to the major reaction components.

2. The method of making an aryl phosphate, which comprises reacting a phenolic compound with phosphorus oxychloride and blowing through the reaction mixture a gas substantially inert to the major reaction components.

3. The method of making an aryl phosphate, which comprises reacting a phenolic compound with a phosphorus oxyhalide and blowing air through the reaction mixture.

4. The method of making an aryl phosphate, which comprises reacting a phenolic compound with phosphorus oxylchloride and blowing air through the reaction mixture.

5. In a method of making an aryl phosphate, the step which consists of removing volatile halogen compounds from the reaction product by contacting the latter with a current of a gas substantially unreactive with the major reaction components and major products under the used conditions.

6. In a method of making an aryl phosphate, the step which consists of blowing volatile halogen compounds from the reaction product by means of a gas substantially unreactive with the major reaction components and major products under the used conditions.

7. In a method of making an aryl phosphate, the step which consists of removing volatile halogen compounds from the reaction product by means of air passing through the reaction mixture.

8. In a method of making an aryl phosphate, the step which consists of removing volatile chlorine compounds from the reaction product by means of air passing through the reaction mixture.

9. The method of making triphenyl phosphate, which comprises reacting phenol with a phosphorus oxyhalide and removing the volatile halogen compounds from the reaction product by blowing a gas, substantially unreactive with the major reaction components, through the mixture.

10. The method of making triphenyl phosphate, which comprises reacting phenol with phosphorus oxychloride and removing the volatile chlorine compounds from the reaction product by blowing a gas substantially unreactive with the major reaction components through the mixture.

11. The method of making triphenyl phosphate, which comprises reacting phenol with a phosphorus oxyhalide and removing the volatile halogen compounds from the reaction product by blowing air through the mixture.

12. The method of making triphenyl phosphate, which comprises reacting phenol with phosphorus oxychloride and removing the volatile chlorine compounds from the reaction product by blowing air through the mixture.

Signed by me this 25 day of Sept., 1929.

FRED BRYNER.